United States Patent [19]
Kuo et al.

[11] Patent Number: 5,442,660
[45] Date of Patent: Aug. 15, 1995

[54] FREQUENCY HOPPING SEQUENCE USING GALOIS FIELD

[75] Inventors: Fan-Ming Kuo, Hsin-Chu; Kwang-Cheng Chen, Ping-Tong, both of Taiwan

[73] Assignee: Industrial Technology Research Institute, Hsinchu, China

[21] Appl. No.: 179,735

[22] Filed: Jan. 10, 1994

[51] Int. Cl.[6] .............................................. H01K 1/10
[52] U.S. Cl. .................................... 375/202; 380/34
[58] Field of Search .............................. 375/1; 380/34

[56] References Cited

U.S. PATENT DOCUMENTS

| | | | |
|---|---|---|---|
| 4,383,323 | 5/1983 | Timor | 375/1 |
| 4,649,549 | 3/1987 | Halpern et al. | 375/1 |
| 5,136,611 | 8/1992 | Kirimoto et al. | 375/1 |
| 5,151,919 | 9/1992 | Dent | 375/1 |
| 5,218,619 | 6/1993 | Dent | 375/1 |
| 5,278,826 | 1/1994 | Murphy et al. | 375/1 |

OTHER PUBLICATIONS

47 C.F.R. §15.247, Operation within the bands 902–928 MHz, 2400–2483.5 MGz, and 5725–5850 MGz. (ii) Frequency hopping systems operating in the 2400–2483.5 MHz and 5725–5850 MHz bands.

*Primary Examiner*—David C. Cain
*Attorney, Agent, or Firm*—Meltzer, Lippe, Goldstein et al.

[57] ABSTRACT

Frequency hopping enables a plurality of channels to share the same bandwidth without interference. The present invention utilizes Galois Field theory to define frequency hopping sequences for a plurality of channels which share the same bandwidth.

4 Claims, 2 Drawing Sheets

FREQUENCY HOPPING SEQUENCE USING GALOIS FIELD

FIELD OF THE INVENTION

The present invention relates to a multichannel communications method which enables multiple channels to simultaneously share the same frequency band without interference. More specifically, according to the invention, Galois field theory is used to define a frequency hopping sequence for each channel to enable a plurality of channels to share the same frequency band.

BACKGROUND OF THE INVENTION

A frequency hopping system involves carrier-frequency shifting in discrete increments in a sequence which determines the order of frequency usage. This permits a plurality of channels to share the same bandwidth without interference. According to the frequency-hopping technique, a plurality of frequencies is selected within the frequency band of interest and each channel hops rapidly from one frequency to the next according to a predetermined sequence. For example, in the 902–928 MHz band the FCC (i.e. United States Federal Communications Commission) requires at least fifty frequencies. In the 2400–2483.5 MHz frequency band, the FCC requires at least seventy-five frequencies. The frequency-hopping technique is especially useful for improving spectrum efficiency in mobile communications systems.

It is an object of the invention to use Galois Field theory to define the frequency hopping sequences for a plurality of channels in a communications system using the frequency-hopping technique.

SUMMARY OF THE INVENTION

In accordance with the present invention, GF(p) represents a Galois Field, where p is a prime number. There is selected within the relevant frequency band p carrier frequencies which are labeled f(0), f(1), ..., f(p−1). There are p−1 communications channels. Each channel, i.e. channel (1), channel (2), ..., channel (p−1) has a sequence of p carrier frequencies which is formed from the set of frequencies and which is different from every other channel.

The frequency sequence for each channel (n), $1 \leq n \leq p-1$, is given by $f_{n,0}, f_{n,1}, \ldots, f_{n,p-1}$, where each $f_{n,m}$, $0 \leq m \leq p-1$, is chosen from the set of f(0), f(1), ..., f(p−1), such that $f_{n,m} = f(m*n)$ where "*" indicates a multiplication in the Galois field GF(p).

DETAILED DESCRIPTION OF THE INVENTION

Figure 1:
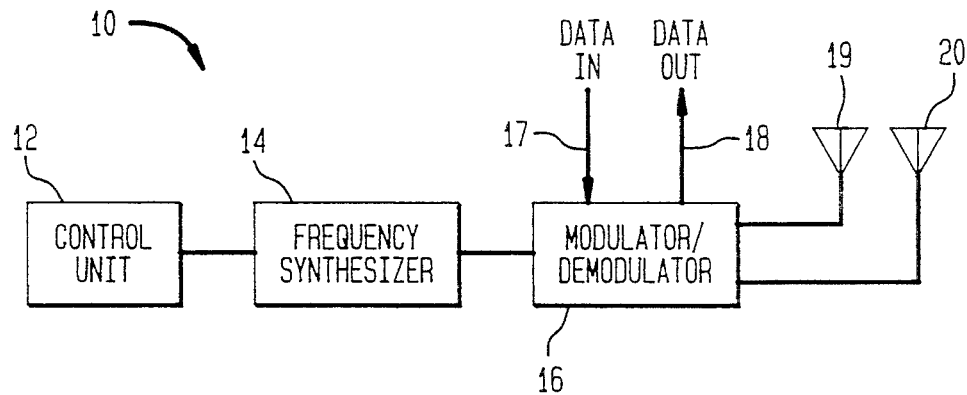
FIG. 1, schematically illustrates a transceiver which can transmit or receive via a channel using a frequency hopping sequence in accordance with the present invention.

FIG. 1 illustrates a transceiver which can transmit or receive via a channel that uses the frequency hopping sequences of the present invention.

The transceiver 10 comprises a control unit 12. The control unit 12 generates control signals which indicate the carrier frequencies to be generated. These control signals are transmitted to a frequency synthesizer 14 which generates the carrier frequencies. The control signals and the corresponding frequency sequence depend on the particular channel being used by the transceiver. The frequencies generated by the frequency synthesizer 14 are transmitted to the modulator/demodulator 16.

The modulator/demodulator 16 modulates incoming data on line 17 onto the carrier frequencies for remote transmission when the transceiver 10 is in a transmitting mode. The modulator/demodulator 16 demodulates data from arriving signals to generate outgoing data on line 18 when the transceiver is in a receiving mode. When the transceiver 10 is in a receiving mode, some initial received data indicates the frequency sequence. This initial data is transmitted to the control unit 12 so the control unit knows the sequence of carrier frequencies for the particular channel. (This initial data is described in greater detail below). The data is transmitted into the transmission medium (e.g. the atmosphere) and received from the transmission medium via the antennae 19, 20.

As indicated above, in the frequency band of interest, p (where p is a prime number) frequencies f(0), f(1), ..., f(p−1) are selected. For each channel n, (n = 1, 2, ..., p−1), the p frequencies are arranged in a different order. For each channel, the sequence is given by $f_{n,0}, f_{n,1}, \ldots, f_{n,p-1}$ where $f_{n,m} = f(n*m)$ and n*m is a multiplication operation in the Galois field GF(p).

Consider for example, the frequency band 902–928 MHz. The FCC requires at least fifty frequencies for this frequency band. In this case, GF(p=61) can be used to generate the frequency hopping sequences. In this case, the frequencies f(0), f(1), ..., f(60) are illustratively separated by 0.41 MHz. The frequency sequences are as follows:

| | |
|---|---|
| channel (1) | f(0), f(1), f(2), f(3), f(4), f(5), f(6) ... f(59), f(60) |
| channel (2) | f(0), f(2), f(4), f(6), f(8), f(10), ... f(55), f(57), f(59) |
| channel (3) | f(0), f(3), f(6), f(9), f(12), ... f(52), f(55), f(58) |
| . | |
| channel (60) | f(0), f(60), f(59), f(58), f(57), f(56), ... f(3), f(2), f(1) |

(For the band of 2.4 GHz to 2.4835 GHz, the FCC requires at least seventy-five frequencies so that GF(p=79) can be used to generate the frequency hopping sequences.)

Figure 2A:
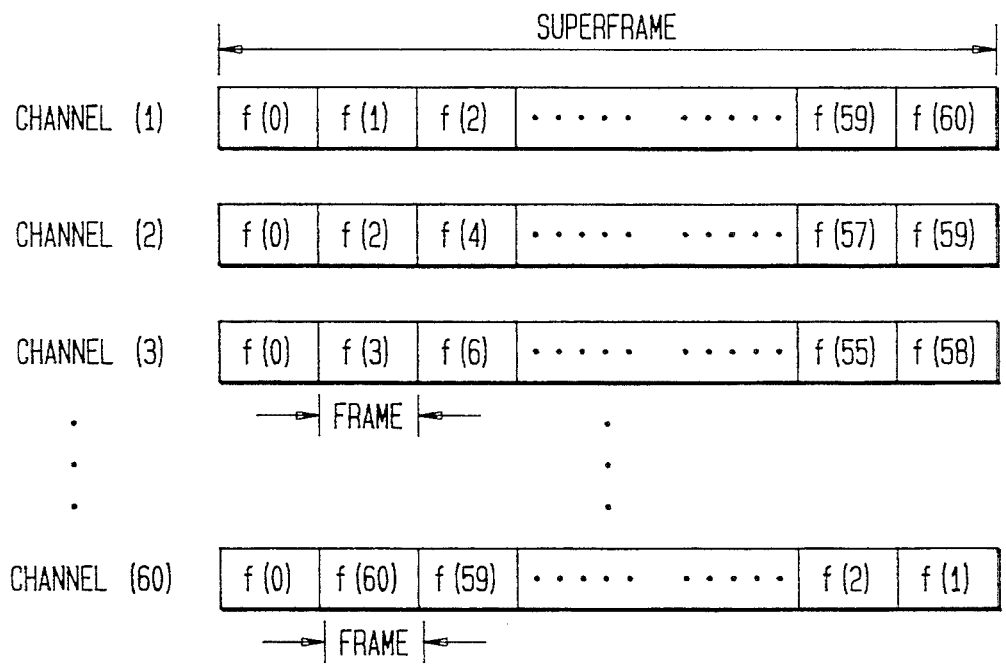
FIG. 2A, FIG. 2B, FIG. 2C and FIG. 2D illustrate the superframes, frames and subframes used for communication via channels which use frequency hopping according to the present invention.

For the case GF(p=61), FIGS. 2A, 2B, 2C and 2D, illustrate the frame structures used to transmit data on each of the channels. FIG. 2A shows a superframe for each channel. For each channel, the superframes follow one after the other. Each superframe comprises the entire sequence of frequencies for that channel. The superframe has a duration of 15,250 milliseconds. As can be seen from FIG. 2A, each superframe comprises sixty frames. Each frame has a duration of 250 milliseconds and contains one frequency of the frequency hopping sequence.

Figure 2B:
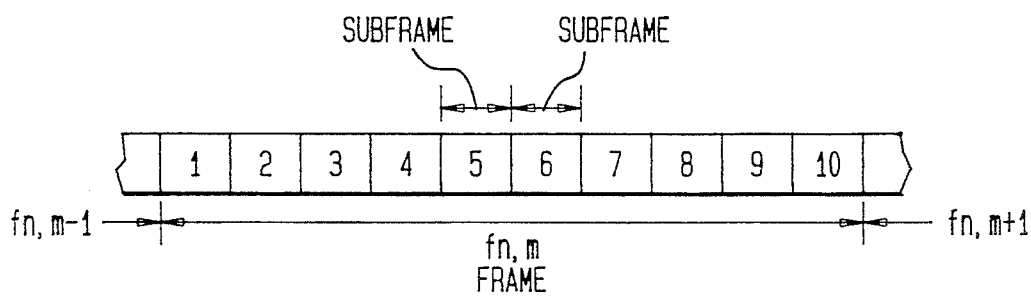

A frame for the channel (n) is shown in FIG. 2B. As can be seen in FIG. 2B, each frame (except the f(0) frame) comprises ten subframes and each subframe has a duration of 25 milliseconds.

Figure 2C:
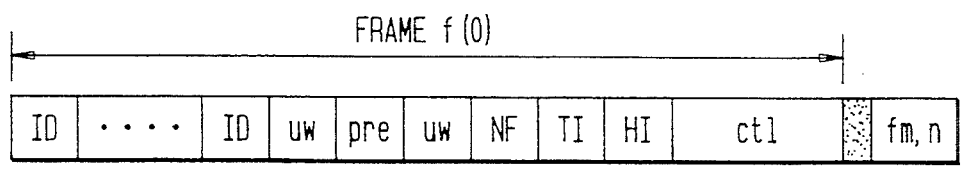

The frame f(0) in each superframe is used for the transmission of control information. The frame f(0) for a particular channel is illustrated in FIG. 2C. In FIG. 2C each of the fields has the following meanings:

"ID" is the identification of the transceiver and this ID is repeated a plurality of times;

"uw" is used to achieve frame synchronization;

"pre" is a timing recovery sequence;

"NF" is the next frequency;

"TI" is the frame number

"HI" is an index which identifies the particular frequency hopping pattern;

"ctl" is a field which is left open for additional control or other information.

Figure 2D:
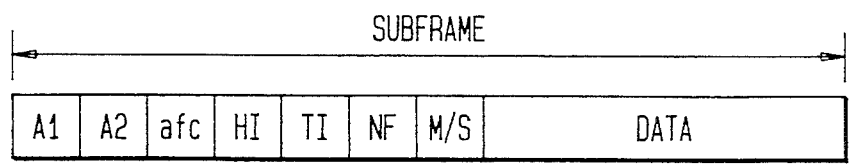

FIG. 2D illustrates one of the subframes of FIG. 2B in greater detail. The fields of the subframe are as follows:

"A1, A2" are preambles used to measure power to decide which of the two antennae 19,20 to use;

"afc" is a preamble for automatic frequency control and timing recovery;

"HI" is an index which identifies the particular frequency hopping pattern;

"TI" is the frame number

"NF" is the next frequency

M/S indicates master/slave and is used for the indication of transceiver status

"data" is data to be transmitted.

The master transceiver refers to the transceiver in a pair of communicating transceivers which initiates the communication. The other transceiver is the slave transceiver. A master transceiver and a slave transceiver communicate by exchanging trains of superframes, wherein each superframe comprises a set of frames and each frame comprises a set of subframes.

At the start of a communication between two transceivers, the master transceiver transmits a tone signal on frequency f(0). The slave transceiver, after receiving the signal on frequency f(0) decodes the signal and hops to the appropriate frequency. Normally, the transceivers are in a receiving mode. The master transceiver thus initiates a communication by transmitting the signal to the slave transceiver.

Figure 3:
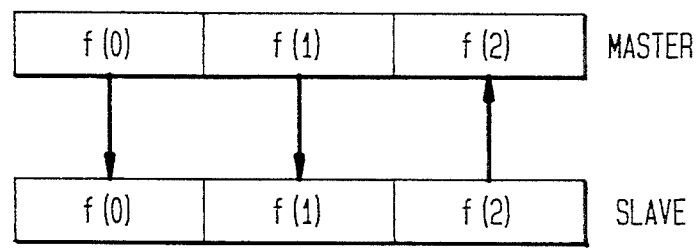
FIG. 3 illustrates the establishment of communication between a pair of transceivers.

As shown in FIG. 3, transmission is initiated over a period of three frames. Illustratively, in a first frame which uses f(0), the master transmits to the slave. In a second frame, which illustratively uses f(1), the master transmits to the slave. In a third frame which illustratively uses f(2), the slave transmits to the master. If communication is not established within three frames the two transceivers start over again.

Finally, the above described embodiments of the invention are illustrative only. Numerous alternative embodiments may be devised by those skilled in the art without departing from the spirit and the scope of the following claims.

We claim:

1. A frequency-hopping communication method for enabling up to p−1 channels of a plurality of channels, channel (1), channel (2), ..., channel (p−1), where p is a prime number, to share a same frequency band, comprising the step of:

for each channel, changing carrier frequency on which data is one of modulated and demodulated every $m^{th}$ fixed length time interval, to an $m^{th}$ frequency of a unique predetermined sequence of carrier frequencies assigned to said channel (n), where n=1 ... (p−1), formed from p frequencies f(0), f(1), f(2), ..., f(p−1) selected from said frequency band but the order of the frequencies for each channel being different, and wherein said $m^{th}$ frequency in the sequence for channel (n) is given by f(m*n) where m*n indicates multiplication in a Galois field GF(p) and $0 \leq m \leq p-1$.

2. The method of claim 1 wherein said frequency band is 902–928 MHz and p=61.

3. The method of claim 1 wherein said frequency band is 2400–2483.5 MHz and p=79.

4. The method of claim 1, wherein each of said sequences from m=0 to m=p−1 defines a super frame, wherein said frequency f(0) is assigned to all channels at time m=0, said method further comprising the steps of:

at a master, modulating onto carrier frequency f(0) a channel identification for an $n^{th}$ channel and a slave identification, at time m=0, and at each slave, demodulating from said carrier frequency f(0) at least said slave identification, at time m=0 and, at said slave indicated by said slave identification, changing carrier frequency to f(1*n) at time m=1.

* * * * *